United States Patent [19]

Sasaki et al.

[11] Patent Number: 4,647,650

[45] Date of Patent: Mar. 3, 1987

[54] PROCESS FOR THE PRODUCTION OF POLYESTER

[75] Inventors: Isao Sasaki; Hiroshi Mori; Masaharu Fujimoto, all of Hiroshima, Japan

[73] Assignees: Mitsubishi Rayon Co., Ltd., Tokyo; Research Association for Synthetic Fiber Tech., Osaka, both of Japan

[21] Appl. No.: 799,680

[22] Filed: Nov. 19, 1985

[30] Foreign Application Priority Data

Nov. 20, 1984 [JP]  Japan ................................. 59-243377

[51] Int. Cl.$^4$ ...................... C08G 63/04; C08G 63/22
[52] U.S. Cl. ................................. 528/274; 528/308.1; 528/308.3; 528/483; 528/501
[58] Field of Search .................. 528/274, 308.1, 308.3, 528/483, 501

[56] References Cited

U.S. PATENT DOCUMENTS

| | | | |
|---|---|---|---|
| 4,161,578 | 7/1979 | Herron | 528/308.3 X |
| 4,205,157 | 5/1980 | Duh | 528/483 X |
| 4,289,871 | 9/1981 | Rowan et al. | 528/483 X |
| 4,360,661 | 11/1982 | Horlbeck et al. | 528/274 X |
| 4,374,975 | 2/1983 | Duh | 528/483 X |
| 4,387,213 | 6/1983 | Horlbeck et al. | 528/483 X |
| 4,532,319 | 7/1985 | Wendling | 528/274 |

*Primary Examiner*—Lucille M. Phynes
*Attorney, Agent, or Firm*—Sughrue, Mion, Zinn, Macpeak and Seas

[57] ABSTRACT

A process for the production of polyester is disclosed, comprising feeding an ester compound made mainly of terephthalic acid and ethylene glycol or an oligomer thereof to a final polymerization reactor, and then polymerizing it in the form of fine molten particles in an inert gas stream, wherein the ester compound has an intrinsic viscosity $[\eta]$ of not more than 0.4 dl/g and a carboxyl terminal group concentration [COOH] of not more than $90 \times [\eta]^{-0.4}$ μeq/g, and the fine particles have an average particle diameter of from 0.015 to 0.5 mm.

7 Claims, No Drawings

PROCESS FOR THE PRODUCTION OF POLYESTER

FIELD OF THE INVENTION

The present invention relates to a process for the production of polyester. More particularly, the present invention relates to a process for rapid polymerization of polyester which comprises melt polycondensing a polyester starting material having a predetermined concentration of a carboxyl terminal group into fine particles having a specific particle diameter range, and then heat polymerizing these particles.

BACKGROUND OF THE INVENTION

Polyester, and particularly polyethylene terephthalate, is widely used as a material for production of fibers and films, or as a molding material, and its industrial value is quite high. For such a molding material or industrial fibers, a polyester is required having a high degree of polymerization. As a process for the production of polyester, the batch polymerization method, the continuous polymerization method, and so forth are known as described in Seni Binran (Fiber Handbook), published by Maruzen Co., Ltd., (Nov. 30, 1968). These conventional methods, however, have disadvantages in that a long time is needed for polymerization, and it is quite difficult to produce polyester having an intrinsic viscosity $[\eta]$ of at least 0.8 dl/g on a commercial scale.

As a method to increase the rate of polymerization of polyester, a method is known, comprising sending BHET (bishydroxyethyl terephthalate) or an oligomer thereof in the form of a thin film having a thickness of from 0.026 to 0.3 mm to a heating zone by the use of an endless metallic belt and then producing the desired polyester through polycondensation, as described in Japanese Patent Publication No. 5119/73. This method is limited in its ability to shorten the time for polymerization, and requires at least thirty minutes in the production of polyester having such a degree of polymerization that the intrinsic viscosity is not less than 0.8 dl/g.

SUMMARY OF THE INVENTION

The present invention relates to a process for producing polyester comprising at least 80% of an ethylene terephthalate repeating unit using as a starting material an ester compound made mainly of terephthalic acid and ethylene glycol or an oligomer thereof, which process is characterized in that an oligomer having an intrinsic viscosity $[\eta]$ of not more than 0.4 dl/g and a carboxyl terminal group concentration [COOH] of not more than $90 \times [\eta]^{-0.4}$ μeq/g is fed to a final polymerization reactor and polymerized in an inert gas stream in the form of fine molten particles having an average particle diameter of from 0.015 to 0.5 mm.

DETAILED DESCRIPTION OF THE INVENTION

In accordance with the process of the present invention, an oligomer having the above-specified carboxyl terminal group concentration and intrinsic viscosity is polymerized in the form of fine particles having a particle diameter falling within the above-specified range, whereupon polyester having a high intrinsic viscosity can be obtained in a short time.

The desired polyester of the present invention is obtained by subjecting a mixture of terephthalic acid or dimethylterephthalate, ethylene glycol, and, if desired, a third component, to an esterification or ester interchange reaction, and then to a polycondensation reaction.

As the third component, bifunctional comonomers such as isophthalic acid, phthalic acid, adipic acid, sebacic acid, propylene glycol, neopentyl glycol, tetramethylene glycol, 1,4-cyclohexanedimethanol, p-oxybenzoic acid, and p-oxyethoxybenzoic acid, polyfunctional cross-linking agents such as trimethylolpropane, pentaerythritol, glycerine, and trimellitic acid, monofunctional terminators such as monomethoxypolyethylene glycol and naphthoic acid, and so forth can be used. In addition, other types of polymers such as polystyrene and a styrene/methyl methacrylate copolymer, pigments such as carbon black and titanium oxide, ultraviolet absorbers, fluorescent whitening agents, insoluble nucleating agents such as kaolin, and so forth can be used.

For the oligomer to be fed to the final polymerization reactor, the intrinsic viscosity $[\eta]$ is not more than 0.4 dl/g and preferably from 0.1 to 0.4 dl/g, and the carboxyl terminal group concentration [COOH] is not more than $90 \times [\eta]^{-0.4}$ μeq/g, and preferably not more than $20 \times [\eta]^{-0.4}$ μeq/g. The intrinsic viscosity as used herein is a value measured at 25° C. in a mixed solvent of equal volume of phenol and tetrachloroethane. The carboxyl terminal group concentration [COOH] is a value measured by the Pohl's method described in *Analytical Chemistry*, Vol. 20, page 1614 (1954).

To produce an oligomer having an intrinsic viscosity $[\eta]$ of more than 0.4 dl/g, a complicated polycondensation reactor is needed, or it is necessary to connect a number of polycondensation reactors in a series. This is disadvantageous from an economic standpoint, and from the standpoints of stability of the process and so forth. On the other hand, if the intrinsic viscosity $[\eta]$ is less than 0.1 dl/g, the capability of the final polymerization reactor is exhibited only insufficiently, and it is necessary to increase the amount of the inert gas supplied. Thus this is disadvantageous from the standpoint of efficiency.

If the carboxyl terminal group concentration [COOH] is more than $90 \times [\eta]^{-0.4}$ μeq/g, a polymer having a high intrinsic viscosity cannot be obtained. A polymer having a higher intrinsic viscosity can be easily obtained by using an oligomer having a carboxyl terminal group concentration [COOH] of not more than $20 \times [\eta]^{-0.4}$ μeq/g. That is, in polymerization of the form of fine molten particles, polycondensation proceeds rapidly when the carboxyl terminal group concentration [COOH] is decreased, and therefore a decomposition reaction scarcely occurs. Accordingly, a polymer having a high intrinsic viscosity can be easily obtained, which in accordance with the conventional method could be obtained only by performing solid-phase polymerization for a long time in order for the polymerization to proceed while depressing a decomposition reaction after the molten polymerization.

In the practice of the present invention, the above oligomer is reacted in an inert gas stream in a polymerization reactor.

The reaction temperature is preferably from 240° to 330° C. If the reaction temperature is lower than 240° C., the reaction time is undesirably lengthened. On the other hand, if the reaction temperature is higher than 330° C., the polymer is colored through thermal decomposition. It is necessary for the oligomer to be in the form of fine molten particles having an average particle diameter of from 0.015 to 0.5 mm. Even if the average particle diameter is made smaller than 0.015 mm, the reaction time cannot be shortened, and recovery efficiency of fine particles is decreased. On the other hand, if the average particle diameter is more than 0.5 mm, the reaction time in the final polymerization reactor is increased, and production efficiency is decreased.

In the reaction system, it is necessary to maintain the vapor pressure of ethylene glycol at a low level, said ethylene glycol being by-produced during the polycondensation reaction. For this purpose, it suffices that the flow rate of the inert gas is controlled to not less than $0.4 \times [\eta]^{-1}$ (m$^3$/min). When the flow rate of the inert gas is controlled as described above, the reaction proceeds quickly. The symbol X indicates an amount of the oligomer supplied (kg/min). It is preferred that the inert gas which is supplied to the final polymerization reactor is heated to the discharge temperature of the oligomer.

Since ethylene glycol by-produced during the polymerization of fine particles is rapidly removed from the polymerization reaction system, de-ethylene glycol polycondensation resulting from the reaction among hydroxy terminal groups proceeds quickly, while esterification, a reaction between a carboxyl terminal group and a hydroxyl terminal group, proceeds relatively slowly. Thus, in polymerization of the oligomer having a high carboxyl terminal group concentration, a polymer having a high intrinsic viscosity cannot be obtained because of the presence of residual carboxyl terminal groups. Under the condition that the carboxyl terminal group concentration is the same, the hydroxyl terminal group concentration at an initial stage of polymerization is greater in an oligomer having a low intrinsic viscosity than in an oligomer having a high intrinsic viscosity. Thus, the esterification reaction of the carboxyl terminal group is easy to proceed and the residual carboxyl terminal group concentration becomes relatively low.

In the process of the present invention, since an oligomer having an intrinsic viscosity [$\eta$] of not more than 0.4 dl/g and a carboxyl terminal group concentration [COOH] of not more than $90 \times [\eta]^{-0.4}$ μeq/g is used, a polymer having a high intrinsic viscosity can be obtained.

The present invention is described in greater detail with reference to the following examples, but the present invention is not to be construed as being limited thereto. In the following examples, all parts are by weight.

EXAMPLE 1

Terephthalic acid and ethylene glycol were continuously fed to an esterification reactor where they were subjected to an esterification reaction, and then a reaction mixture was sent to a polycondensation reactor where it was polycondensed to produce an oligomer having an intrinsic viscosity [$\eta$] of 0.15 dl/g and a carboxyl terminal group concentration [COOH] of 42 μeq/g. To 100 parts of the oligomer thus produced was added 0.05 part of antimony trioxide as a catalyst, and the resulting mixture was introduced into a cylindrical final polymerization reactor. The oligomer was heated to 295° C. with a heater provided at the top of the final polymerization reactor, and then immediately introduced in a rotary atomizer rotating at a high speed at a flow rate of 66 g/min to obtain fine particles having an average particle diameter of 0.09 mm. These particles were dispersed in nitrogen gas supplied from the top of the final polymerization reactor at a flow rate of 0.18 m$^3$/min and heated to 295° C. A polymer recovered in a cyclone collector provided to the bottom of the final polymerization reactor after the reaction was completed was polyester having an intrinsic viscosity [$\eta$] of 0.71 dl/g and also having good color tone. The average time required for individual fine particles to be recovered in the cyclone collector after it was dispersed in the nitrogen gas (this is hereinafter referred to as an "average retention time") was 30 seconds.

COMPARATIVE EXAMPLE I

Terephthalic acid and ethylene glycol were continuously fed to an esterification reactor where they were subjected to an esterification reaction, and then the reaction mixture was subjected to a polycondensation reaction in a polycondensation reactor to produce an oligomer having an intrinsic viscosity [$\eta$] of 0.15 dl/g and a carboxyl terminal group concentration [COOH] of 302 μeq/g. To 100 parts of the oligomer thus produced was added 0.05 part of antimony trioxide as a catalyst, and the resulting mixture was introduced into a cylindrical final polymerization reactor. The oligomer was heated to 295° C. with a heater provided at the top of the final polymerization reactor, and then immediately introduced in a rotary atomizer rotating at a high speed at a flow rate of 66 g/min to obtain fine particles having an average particle diameter of 0.09 mm. These particles were dispersed in nitrogen gas supplied from the top of the final polymerization reactor at a flow rate of 0.18 m$^3$/min and heated to 295° C. A polymer recovered in a cyclone collector provided to the bottom of the final polymerization reactor after the reaction was completed had an intrinsic viscosity [$\eta$] of 0.24 dl/g.

EXAMPLES 2 TO 10, AND COMPARATIVE EXAMPLES 2 TO 7

Polymerization of 100 parts of oligomers having various qualities with 0.05 part of antimony trioxide as a catalyst added thereto was conducted wherein polymerization conditions in a final polymerization reactor were changed as indicated. The intrinsic viscosities [$\eta$] of each polymer thus obtained is shown in the Table. The acid value in the Table indicates the carboxyl terminal group concentration [COOH].

TABLE

| | Oligomer | | | | | Nitrogen | | Average | |
|---|---|---|---|---|---|---|---|---|---|
| | [$\eta$] (dl/g) | Acid Value (μeq/g) | Amount Supplied (kg/min) | Discharge Temperature (°C.) | Particle Diameter (mm) | Temperature (°C.) | Flow Rate (m$^3$/min) | Retention Time (sec) | Recovered Polymer [$\eta$] (dl/g) |
| Example | | | | | | | | | |
| 2 | 0.32 | 11 | 0.066 | 295 | 0.3 | 295 | 0.09 | 40 | 0.62 |
| 3 | 0.32 | 11 | 0.066 | 295 | 0.18 | 295 | 0.09 | 40 | 0.71 |
| 4 | 0.15 | 42 | 0.066 | 295 | 0.06 | 295 | 0.18 | 30 | 0.78 |
| 5 | 0.15 | 42 | 0.066 | 295 | 0.03 | 295 | 0.18 | 30 | 0.81 |
| 6 | 0.32 | 11 | 0.105 | 295 | 0.1 | 295 | 0.18 | 30 | 0.89 |

TABLE-continued

| | Oligomer | | | | | Nitrogen | | Average | |
| | $[\eta]$ (dl/g) | Acid Value ($\mu$eq/g) | Amount Supplied (kg/min) | Discharge Temperature (°C.) | Particle Diameter (mm) | Temperature (°C.) | Flow Rate (m³/min) | Retention Time (sec) | Recovered Polymer $[\eta]$ (dl/g) |
|---|---|---|---|---|---|---|---|---|---|
| 7 | 0.15 | 42 | 0.066 | 310 | 0.09 | 310 | 0.18 | 30 | 0.95 |
| 8 | 0.32 | 11 | 0.105 | 310 | 0.09 | 310 | 0.18 | 30 | 1.12 |
| 9 | 0.15 | 8 | 0.066 | 320 | 0.06 | 320 | 0.18 | 40 | 1.84 |
| 10 | 0.15 | 8 | 0.105 | 320 | 0.1 | 320 | 0.18 | 40 | 1.47 |
| Comparative Example | | | | | | | | | |
| 2 | 0.15 | 302 | 0.066 | 295 | 0.3 | 295 | 0.18 | 30 | 0.19 |
| 3 | 0.15 | 302 | 0.066 | 295 | 0.17 | 295 | 0.18 | 30 | 0.22 |
| 4 | 0.15 | 302 | 0.066 | 295 | 0.06 | 295 | 0.18 | 30 | 0.26 |
| 5 | 0.15 | 302 | 0.066 | 295 | 0.03 | 295 | 0.18 | 30 | 0.27 |
| 6 | 0.32 | 11 | 0.066 | 295 | 0.7 | 295 | 0.09 | 30 | 0.39 |
| 7 | 0.15 | 302 | 0.066 | 320 | 0.06 | 320 | 0.18 | 40 | 0.35 |

In the Table, Examples 2 and 3 each demonstrates a relation between the particle size of the oligomer and the intrinsic viscosity $[\eta]$ of the recovered polymer.

Examples 4 and 5 each demonstrates a case in which the acid value of the oligomer was slightly large and the particle size was small.

Example 6 demonstrates a case in which the acid value of the oligomer was small and the particle size was small.

Examples 7 and 8 each demonstrates a case in which the polymerization reaction temperature was relatively high.

Examples 9 and 10 each demonstrates a relation between the particle diameter of the oligomer and a high temperature reaction.

Comparative Examples 2 to 5 each demonstrates a case in which the oligomer having a high acid value was used.

Comparative Example 6 demonstrates a case in which the particle diameter of the oligomer was too large.

Comparative Example 7 demonstrates a case in which the oligomer having a high acid value was used.

EXAMPLE 11

Polymerization was carried out in the same manner as described in Example 1, except that a mixture of terephthalic acid and isophthalic acid (the weight ratio of terephthalic acid to isophthalic acid=9/1) was used instead of terephthalic acid, and the intrinsic viscosity $[\eta]$ and the carboxyl terminal group concentration [COOH] of the oligomer produced were 0.15 dl/g and 40 $\mu$eq/g, respectively. A polymer recovered had an intrinsic viscosity $[\eta]$ of 0.70 dl/g.

EXAMPLE 12

Polymerization was carried out in the same manner as described in Example 1, except that dimethylterephthalate was used instead of terephthalic acid for ester interchange reaction, and the intrinsic viscosity $[\eta]$ and the carboxyl terminal group concentration [COOH] of the oligomer produced were 0.14 dl/g and 6 $\mu$eq/g, respectively. A polymer recovered had an intrinsic viscosity $[\eta]$ of 0.77 dl/g.

While the invention has been described in detail and with reference to specific embodiments thereof, it will be apparent to one skilled in the art that various changes and modifications can be made therein without departing from the spirit and scope thereof.

What is claimed is:

1. A process for producing polyester comprising at least 80% of an ethylene terephthalate repeating unit using as a starting material an ester compound made mainly of terephthalic acid and ethylene glycol or an oligomer thereof, comprising producing an oligomer having an intrinsic viscosity $[\eta]$ of not more than 0.4 dl/g and a carboxyl terminal group concentration [COOH] of not more than $90 \times [\eta]^{-0.4}$ $\mu$eq/g by an esterfication or ester interchange reaction, feeding the oligomer to a final polymerization reactor containing an atomizer, heating the oligomer to 240° C. to 330° C. in said final polymerization reactor, dispersing the oligomer in the form of fine molten particles having an average particle diameter of from 0.015 to 0.5 mm in an inert gas stream by introducing the oligomer into said atomizer, and polymerizing the oligomer in the form of fine molten particles in said inert gas stream.

2. A process as in claim 1, wherein the starting material further contains a third component.

3. A process as in claim 2, wherein the third component is a difunctional monomer, a polyfunctional crosslinking agent, a monofunctional terminator, an other type of polymer, a pigment, a ultraviolet absorber, a fluorescent whitening agent, or an insoluble nucleating agent.

4. A process as in claim 1, wherein the intrinsic viscosity $[\eta]$ of the oligomer is from 0.1 to 0.4 dl/g.

5. A process as in claim 1, wherein the carboxyl terminal group concentration [COOH] is not more than $20 \times [\eta]^{-0.4}$ $\mu$eq/g.

6. A process as in claim 1, wherein the flow rate of the inert gas is not less than $0.4 \ X \times [\eta]^{-1}$ (m³/min) wherein X is the amount of the oligomer supplied (kg/min).

7. A process as in claim 1, wherein the inert gas stream which is supplied to the final polymerization reactor is heated to the temperature of the oligomer.

* * * * *